Figure 1:
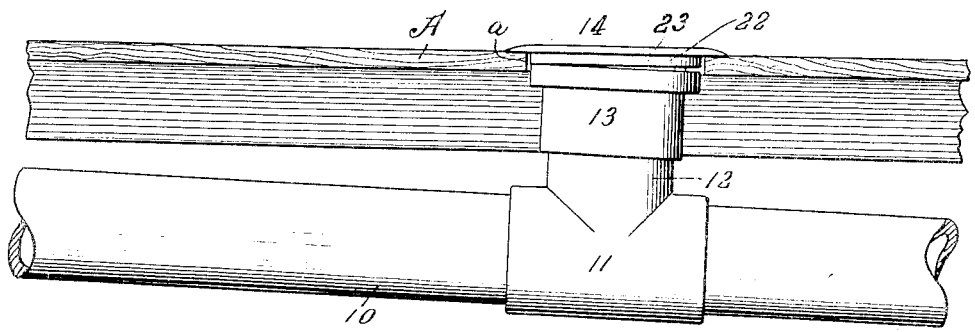

C. R. THURMAN.
VALVE FOR VACUUM CLEANING SYSTEMS.
APPLICATION FILED APR. 13, 1911.

1,037,083.

Patented Aug. 27, 1912.

2 SHEETS—SHEET 1.

Witnesses

Inventor
Charles R. Thurman

By Meyers, Cushman & Rea
Attorneys

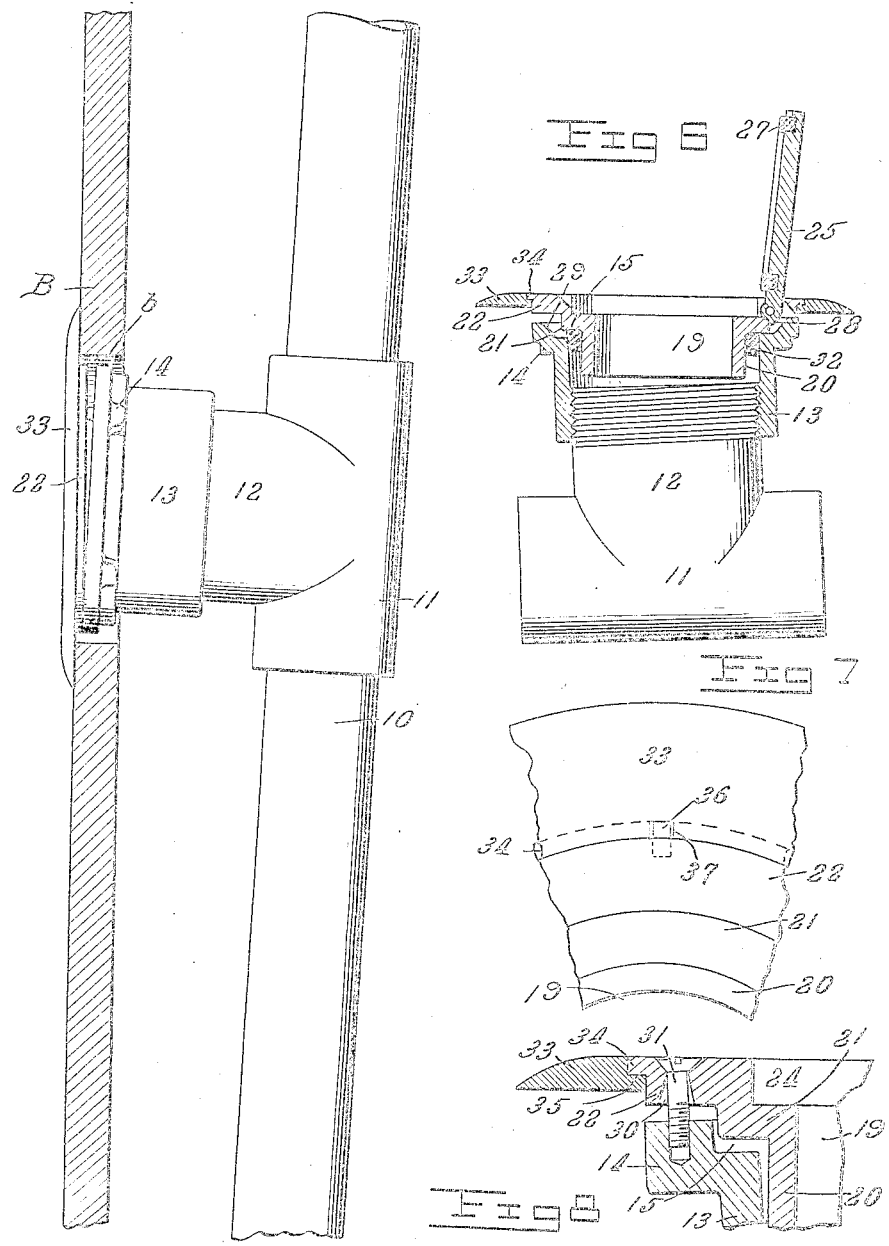

UNITED STATES PATENT OFFICE.

CHARLES R. THURMAN, OF PITTSBURGH, PENNSYLVANIA, ASSIGNOR TO ELECTRIC RENOVATOR MANUFACTURING COMPANY, OF PITTSBURGH, PENNSYLVANIA, A CORPORATION OF PENNSYLVANIA.

VALVE FOR VACUUM CLEANING SYSTEMS.

1,037,083.  Specification of Letters Patent.  Patented Aug. 27, 1912.

Application filed April 13, 1911. Serial No. 620,958.

*To all whom it may concern:*

Be it known that I, CHARLES R. THURMAN, a citizen of the United States, residing at Pittsburgh, in the county of Allegheny and State of Pennsylvania, have invented new and useful Improvements in Valves for Vacuum Cleaning Systems, of which the following is a specification.

This invention relates to a hose coupling member for pneumatic cleaning systems, and has for its main object to provide a coupling which can be inserted in a wall or floor flush therewith irrespective of the fact that the air exhaust pipe, within the wall or below the floor, is out of line with or does not lie parallel to the surface of said wall or floor.

Buildings in which the pneumatic cleaning system is employed have the air pipes placed in the walls and under the floors to which pipes are connected a coupling member situated in the wall or floor of each room for attaching the hose of a pneumatic cleaning device. These coupling members are in many cases, if not in all, provided each with a flange, collar or escutcheon to cover the hole in the wall or floor through which the coupling passes. Often in placing the air pipes the workmen do not set them up so that they will be parallel with the surface of the wall or floor, and as a consequence the flange, collar or escutcheon will not lie flat against said surface because the coupling member, rigidly fastened to said pipe, is not perpendicular to the surface. This ill-fitting of the flange or escutcheon detracts from the appearance of a room and in other ways is objectionable, being especially noticeable with coupling members which do not project from the wall or floor, but are substantially flush therewith and have a valve which closes flush with the flange or escutcheon. To overcome this defect and furnish a coupling member, the flange or escutcheon of which will, at all times lie flat against a wall or floor notwithstanding the inclination of the air pipe, is the principal object of this invention, the accomplishment of which is attained by providing a sleeve or collar threaded on the air pipe or on a fitting on said pipe and loosely telescoping in said sleeve the coupling member, fastening the same thereto by screws, bolts or other suitable means. The loose fit between the sleeve and the coupling member permits the latter to enter the former at an angle so that the flange or escutchon on the coupling member can rest flat against the surface of a wall or floor.

Another object of the invention is directed to the valve for closing the mouth of the coupling member and its relation to the sleeve, and the fastening devices connecting the coupling member and sleeve.

With these main objects in view and others to be set forth later, the invention consists in the construction, combination and arrangement of parts to be hereinafter described in detail, and pointed out in the appended claims, reference being had to the accompanying drawings which show one embodiment of the invention.

Figure 3:
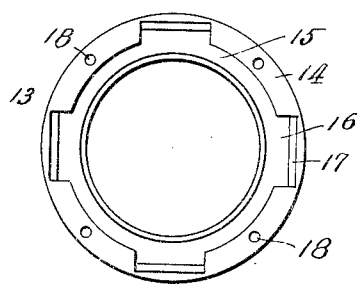
Figure 2:
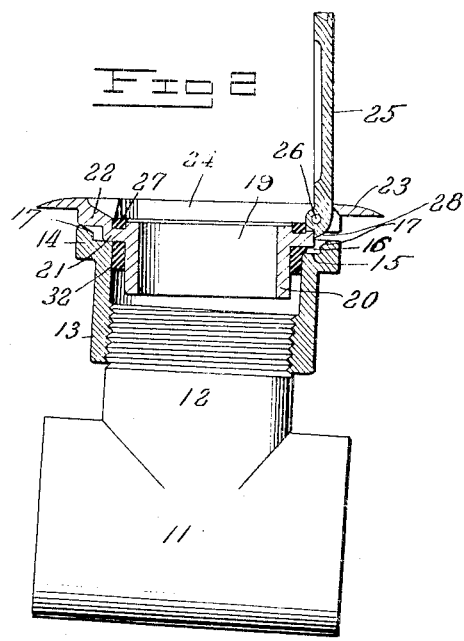
Figure 4:
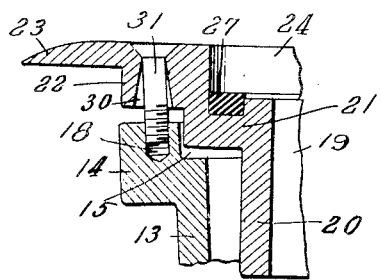

In these drawings:—Figure 1 is a side view of an air pipe with the improved coupling member connected thereto as applied to the floor of a room. Fig. 2 is a vertical central sectional view of the coupling member attached to a pipe fitting. Fig. 3 is a top plan view of the sleeve by means of which the coupling member is connected to the air pipe. Fig. 4 is an enlarged section view of a portion of the coupling member and sleeve to illustrate certain details of construction. Fig. 5 is a side view of an air pipe and a modified form of the invention connected thereto. In this instance the coupling member is inserted in the wall of a room instead of the floor. Fig. 6 is a vertical central sectional view of the modified construction. Figs. 7 and 8 are enlarged detail views showing features of construction of the modified form of the invention.

In the drawings, the numeral 10 indicates an exhaust pipe situated below the floor A, or within the wall B of a room. On the pipe 10 is a T-connection 11, the branch 12 of which is, in this instance, exteriorly threaded and directed toward an opening $a$ in the floor, as in Fig. 1, or an opening $b$ in the wall as in Fig. 2. Screwed on the branch 12 is a collar or sleeve 13 provided with a flange 14 on its upper end close to or within said opening. In the outer face of the flange 14 a socket or depression 15 is formed concentric with the bore of the sleeve 13 and of slightly greater diameter. A plurality of radial recesses 16 extend outwardly from the socket or depression 15 into the flange 14, in the form shown in Figs. 1, 2 and 3, the upper corners of which recesses are preferably beveled or inclined as at 17. The recesses 16 may vary in number, four being shown in the drawings. Between the recesses are threaded holes 18, for a purpose to be described later.

The hose coupling member is indicated by the numeral 19 and comprises a tubular extension 20 of less diameter than the bore of the sleeve and adapted to fit loosely therein; an encircling shoulder 21 at the outer end of the tubular extension is provided to fit loosely in the socket or depression 15 in the sleeve and limit the inward movement of the member. Surrounding the shoulder 21 is a flange 22 of the same diameter as the flange 14 on the sleeve. The member 19 is finished exteriorly by a preferably circular escutcheon 23 projecting beyond the flange 22 and adapted to extend over and cover the opening a or b in the floor or wall respectively. A seat 24 is formed in the exterior of the member 19, for a valve 25 pivoted at 26, which is normally closed as in Figs. 1 and 5 to prevent suction through the coupling and into the pipe 10. An annular groove may be made in the bottom of the seat 24 for a packing ring 27, as in Figs. 2 and 4, or in the valve itself, see Fig. 6.

Projecting rearwardly from the valve pivot 26 is a lug 28 which, when the valve is raised, strikes the shouldered portion of the hose coupling member and limits the movement of the valve when opened. In the preferred form, represented in Fig. 2, the valve is arrested a little before it reaches a vertical position. Its center of gravity, therefore, is on the inner side of the pivot 26 so that when the hose connection is withdrawn from the coupling, the valve will close automatically. This is of great advantage when the coupling is placed in the floor as the valve cannot be left open through forgetfulness. To prevent the lug 28 from interference with the flange 14 of the sleeve 13, the recesses 16 hereinabove described are provided. Instead of recesses, the edge of the depression or socket 15 may be beveled, as at 29, Fig. 6.

In assembling the parts of the coupling after the exhaust pipes are in place, the collar or sleeve 13 is first screwed on the branch 12 of the T-connection. The tubular extension 20 of the hose connection is then inserted in the sleeve 13 until the escutcheon bears on the floor or walls, after which screws 31 are inserted in holes 30 in the sleeve 22 and screwed into the threaded holes 18 in the sleeve flange 14. To prevent leakage of air between the sleeve and the tubular extension, a packing of rubber, cement or other suitable material 32 is placed between said parts as shown. Should the air pipe 10 be inclined to the wall or floor, the sleeve 13 will also be inclined as its axis is perpendicular to the axis of the pipe. If now, the tubular extension 20 fitted the sleeve snugly, the pipe coupling would stand at the same inclination as the tubular extension and the escutcheon touch the floor or wall at one side only, the other side being raised. But, by making the tubular extension 20 of less diameter than the bore of the sleeve, the escutcheon can lie flat against the wall or floor as the tubular extension will be able to adjust itself within the sleeve, its axis standing at an angle to the axis of said sleeve. To prevent the screws 31 from binding in the holes 30 the latter may be made tapering or wider at the bottom as shown to permit lateral movement of the screws. By arranging the screw holes 18 midway between the recesses 16, as in Fig. 3, any one of said recesses may be uppermost when the coupling is used on the wall, as the hinge member on the valve 25 is adapted to fit any recess, and in this case said hinge member will be seated in the uppermost recess to permit the valve closing by gravity.

The escutcheon is preferably made integral with the coupling member, but if desired it may be separate therefrom as in Figs. 6, 7 and 8. In this instance the escutcheon 33 is a broad flat ring, the opening therein being of a diameter to fit snugly over the flange 22 on the coupling member. The escutcheon is retained on the coupling member by a bead 34 on the outer edge of the flange 22 fitted in a seat 35 in the escutcheon. Rotation of the escutcheon is prevented by a pin 36 projecting from said flange into a notch 37 cut in the escutcheon, see Fig. 7.

From the above description it will be clear that the imperfect erection of air pipes will not interfere in the least with the proper seating of the coupling member. The difference in diameter between the tubular extension 20 and the bore of the sleeve 13, with a yielding packing between them gives a relatively wide range of adjustability to the coupling member so that the thin escutcheon and the valve exteriorly flush with the escutcheon will at all times lie flat against the wall or floor surface without any noticeable projection.

Having fully described my invention, what I claim as new is:—

1. A device of the character described, comprising a two part telescopic hose coupling one of said parts fitting loosely within the other to permit of their being moved out of coaxial relation and provided with means for the attachment thereto of a hose, a yielding fluid tight packing between said parts, and means for securely connecting said parts together either coaxially or in angular relation.

2. A device of the character described, comprising a sleeve member attachable rigidly and coaxially to a pipe, a coupling member adapted to loosely fit within said sleeve in axial alinement therewith or at an angle thereto and provided with means for the attachment of a hose, a yielding fluid tight packing between said members, and means for fastening the coupling member to the sleeve.

3. A device of the character described, comprising a sleeve member attachable rigidly and coaxially to a pipe, a coupling member formed with an exterior bearing flange adapted to loosely fit within said sleeve in axial alinement therewith or at an angle thereto and provided with means for the attachment of a hose, a flexible fluid tight packing between said sleeve member and the coupling member, and means for fastening the coupling member rigidly to the sleeve member and the flange flat against a floor or wall irrespective of the angular relation of said parts.

4. A device of the character described, comprising a sleeve adapted to be rigidly connected to a suction pipe, a coupling member having a tubular extension of less diameter than and insertable in the bore of said sleeve in axial alinement therewith or at an angle thereto, yielding packing between the sleeve and the tubular extension, and a swinging valve for closing the outer end of said coupling member.

5. A device of the character described, comprising a sleeve provided with means at one end connected with a pipe and a lateral flange on its other end formed with a depressed seat, and a coupling member having a tubular extension of less diameter than the bore of the sleeve and inserted therein, a shoulder to engage said depressed seat and limit the inward movement of the coupling member, and an escutcheon on its outer end, said sleeve and coupling adapted to be set at an angle to each other, a packing between the sleeve and the coupling member, and means for rigidly connecting said parts together.

6. A device of the character described, comprising a sleeve provided with means at one end to connect it with a pipe and a lateral flange on its other end formed with a depressed seat, and a plurality of outwardly extending radial recesses connected to said seat, a coupling member having a tubular extension of less diameter than the bore of the sleeve and inserted therein, a shoulder to engage said depressed seat and limit the movements of the coupling member and an escutcheon on its outer end, said sleeve and coupling adapted to be set at an angle to each other, a swinging valve having a stop adapted to enter one of said recesses and engage said shoulder and limit the movement of the valve when opened, a packing between the sleeve and the coupling member, and means for connecting said parts rigidly together.

7. A device of the character described, comprising a sleeve provided with means at one end to connect it with a pipe, a lateral flange on its other end formed with a depressed seat, and a plurality of spaced radial recesses connected with said seat, said flange being also provided with an opening intermediate each two recesses, and a coupling member having a tubular extension of less diameter than the bore of the sleeve and inserted therein, said sleeve and coupling member adapted to be set at an angle to each other, a packing between said parts, and means extending through openings in the coupling member and the aforesaid holes in the flange of the sleeve for fastening said parts rigidly together.

8. A device of the character described, comprising a two-part telescopic hose coupling, one of said parts fitting loosely within the other to permit of their being moved out of coaxial relation, an escutcheon surrounding said inner fitting part, a yielding fluid tight packing between said parts, and means for securely connecting said parts together either coaxial or in angular relation and hold said escutcheon close to a floor or wall.

In testimony whereof I have hereunto set my hand in presence of two subscribing witnesses.

CHARLES R. THURMAN.

Witnesses:
B. F. RICHARDS,
C. M. KOCHER.